Aug. 15, 1944.  S. H. HAHN ET AL  2,355,858
APPARATUS FOR DETERMINING THE RELATIVE POROSITY
OF VARIOUS POROUS MATERIALS
Filed Oct. 17, 1941  2 Sheets-Sheet 1

Inventors
Stuart H. Hahn
Robert H. Judson
By Willis T. Avery
Atty

Aug. 15, 1944.  S. H. HAHN ET AL  2,355,858
APPARATUS FOR DETERMINING THE RELATIVE POROSITY
OF VARIOUS POROUS MATERIALS
Filed Oct. 17, 1941  2 Sheets-Sheet 2
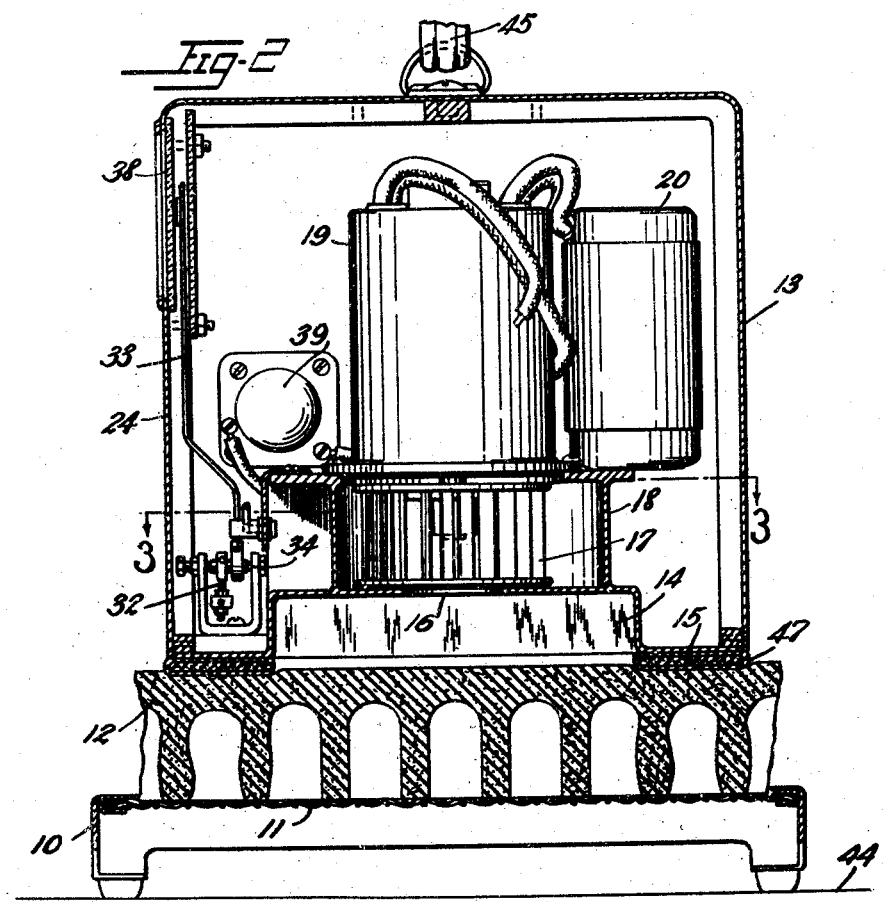
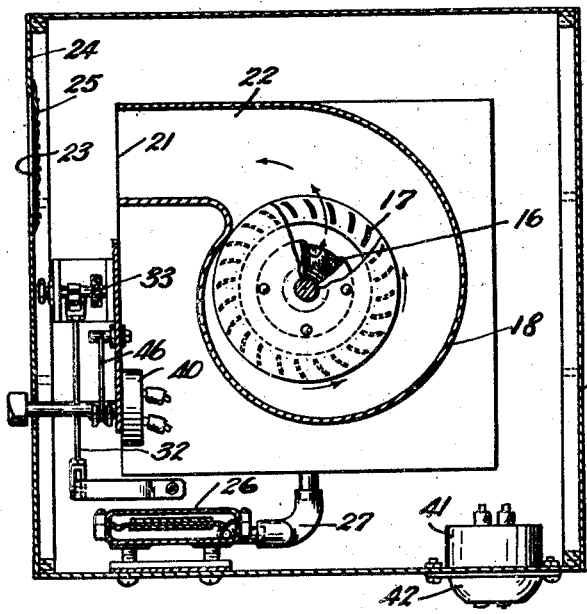
Inventors
Stuart H. Hahn
Robert H. Judson
By Willis F. Avery
Atty Patented Aug. 15, 1944

2,355,858

UNITED STATES PATENT OFFICE 2,355,858

APPARATUS FOR DETERMINING THE RELATIVE POROSITY OF VARIOUS POROUS MATERIALS

Stuart H. Hahn and Robert H. Judson, Akron, Ohio, assignors to The B. F. Goodrich Company, New York, N. Y., a corporation of New York Application October 17, 1941, Serial No. 415,416

11 Claims. (Cl. 73—51)

This invention relates to an apparatus for testing the relative porosity of various porous materials, and particularly to a portable apparatus that may be readily moved about from place to place wherever such testing may be required. The chief object of this invention is the provision of a new machine for determining relative porosities of various materials by drawing a fluid such as air through the material to be tested and measuring the rate of flow of the fluid through the material.

In this invention we have perfected a compact and efficient machine for determining the relative porosities of various porous materials. In its preferred embodiment, as hereinafter disclosed, the apparatus for determining the porosity of porous materials comprises a platform having a foraminous surface to permit the free flow of air through a porous material placed thereon to be tested, together with a porosity measuring apparatus comprising means for setting up and maintaining a current of air or other fluid through the porous material and means for measuring the rate of flow of such fluid through the porous material. The porosity measuring apparatus, in its preferred form, is small and compact so that it can be easily lifted and transported with one hand. It comprises a vacuum chamber to be placed in contact with the porous material, a power-driven fan for evacuating air from the vacuum chamber, an outlet port for emitting the air, a mechanical pressure gauge for measuring the degree of partial vacuum in the vacuum chamber, and indicating means for indicating this degree of partial vacuum on a fixed scale. Another important part of the apparatus is an arm connected to the manually operated switch which starts and stops the power-driven fan. This arm forces and holds the indicating means in a pre-determined position when the switch is turned off. The importance of this action will be explained later.

The principles embodied in the present invention may conveniently be shown in a portable apparatus capable of being conveniently carried about and readily used in various places. Such an apparatus is shown in the accompanying drawings of which, Fig. 1 is a front elevation, partially in cross-section, of the entire apparatus with a piece of rubber sponge being tested and with the front panel partially broken away for clarity of illustration;

Fig. 2 is a cross-sectional view of the apparatus taken along line 2—2 of Fig. 1;

Fig. 3 is a horizontal sectional view of the apparatus taken along line 3—3 of Fig. 2;

Figure 1:
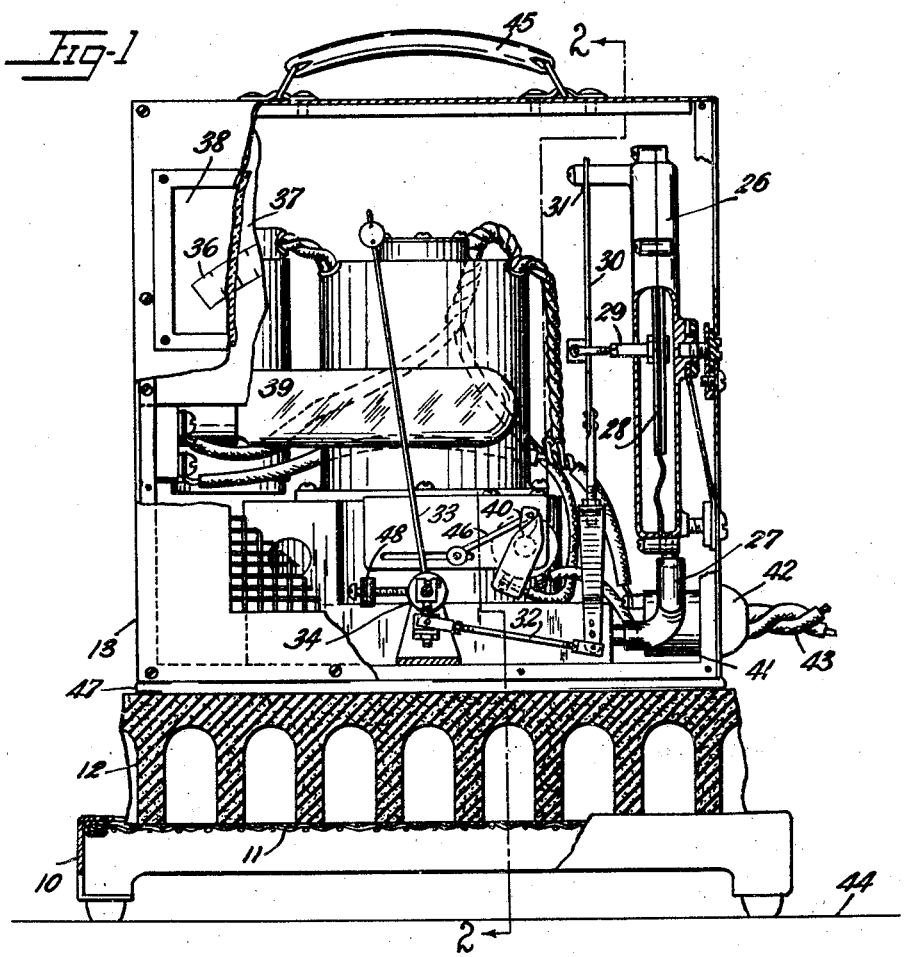

The assembly illustrated in the drawings comprises a pedestal 10 open at the sides and covered with a screen 11 on which is to be placed a piece of sponge rubber 12 for testing. The porosity measuring apparatus 13 is designed so that it rests on the sponge 12 with a vacuum chamber 14 in contact with the sponge. The rim 15 of the apparatus is flat and provided with a soft non-permeable rubber gasket 47 so that an airtight contact can be maintained. The vacuum chamber 14 is connected through a circular orifice 16 to an evacuating fan 17 situated in a housing 18. The fan 17 is driven by means of a substantially constant-speed electric motor 19 having an attached capacitor 20. An opening 21 is provided in the fan outlet 22 and opposite this is a square opening 23 in the metal cover sheet 24 and covered by a wire screen 25. The cover sheet 24 covers the entire apparatus so that it has the appearance of a cubical box which in the present case is about nine inches on a side. For measuring the vacuum in the vacuum chamber there is provided a dry vacuum gauge 26 connected to the vacuum chamber 14 by means of a right-angled coupling 27. This communicates with the gauge 26 in which is provided a movable diaphragm 28. The movable diaphragm 28 is connected by means of a connecting arm 29 to a spring lever 30 fastened at one end 31 and with the other end of the spring lever connected by means of an arm 32 to an indicator 33. This indicator is mounted on a pivot 34 where it is free to swing back and forth. A counter-balance 40 is provided on the indicator near the pivot 34. The indicator 33 operates against a scale 36 adhered to a piece of translucent plastic 37. The scale may be made in any form desired but in this case it is one with equidistant divisions and is reproduced on a transparent piece of photographic film. This scale 36 is covered with a piece of clear plastic 38 fastened in the covering case 24 and through which the scale and the indicator can be viewed. A lamp 39 is placed behind the printed scale so that the degree of porosity can be easily read from the scale 36. This lamp is wired in parallel to the motor 19 so that it is turned on and off by the switch 40 that starts and stops the constant speed motor 19. The motor 19 and lamp 39 are wired in parallel and the switch 40 is wired in series with the lamp and motor. The apparatus is provided with a male electrical receptacle 41 into which may be inserted a female plug 42 carrying wires 43 to an electrical outlet which is the source of electrical energy to operate the apparatus. The wiring diagram within the porosity testing apparatus is quite simple with the switch 40 in series in the line and the lamp 39 and motor 19 in parallel.

Figure 4:
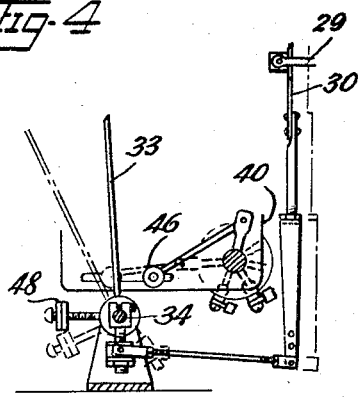
Fig. 4 is a detailed elevational view, partially in cross-section, of the indicating arm of the apparatus connected in a particular manner to the manually operated electrical switch for starting and stopping the apparatus.

To operate the porosity testing apparatus 13 in connection with a piece of latex rubber sponge 12 the foraminous pedestal 10 is placed on a flat surface 44, the rubber sponge is placed on the pedestal, and the porosity meter is lifted by means of the handle 45 and placed on the sponge. The control switch 40 is turned on and this immediately starts the constant speed motor 19 and lights up the lamp 39. The motor 19 operates the rotary fan 17 to draw air from the vacuum chamber 14 and set up a flow of air through the sponge 12. As there is resistance to this flow of air there will always be a partial vacuum in the vacuum chamber 14 while the apparatus is in operation. In this way porosity may be measured as the degree of porosity is an inverse function of the amount of vacuum maintained in the vacuum chamber 14. An orifice 16 is placed between the fan 17 and the chamber 14 so that there is increased resistance to the flow of air. The increased resistance to flow provided by the orifice 16 is directly proportional to the square of the air flow so that instead of a non-linear function in the fan characteristics we now get a more nearly linear function. This means that the vacuum in the vacuum chamber 14 is consequently a more nearly linear function of the air flow through the porous materials being tested and that the vacuum as indicated by the indicator arm 33 on the linear scale 36 is correspondingly a true indication of the porosity of the material being tested. In other words, when testing two materials, one of which is twice as porous as the other, the less porous one will cause the arm 33 to move a certain distance while the more porous one will cause the arm to move substantially twice as far. As can be seen, the orifice diameter used depends upon the fan characteristics of draft versus flow which is in turn controlled by the size and speed of the fan. In the present case the motor is a $\frac{1}{40}$ H. P. capacitor type motor, the fan is a No. 00 Torrington Manufacturing Company fan of 3" x 1½" size with 27 forward curving blades and operating at 3600 R. P. M., and the orifice is ¾ inch in diameter. The orifice may be placed as indicated at 16, or anywhere in the enclosed air stream as, for instance, at 21. The air from the fan is exhausted through a circular opening 21 in the fan housing 18 and discharged through a square opening 23 provided in the sheet metal cover plate 24, the opening 23 being covered by a piece of wire screen 25. As a practical matter the opening 23 in the cover plate 24 is spaced a short distance from the opening 21 in the fan housing 18 so that if the first opening 23 is accidently closed the free flow of expelled air will not be impeded but will flow through other vents in the cover plate 24. To measure the degree of vacuum in the vacuum chamber 14 and thus the porosity of the material being tested a dry vacuum gauge 26 is connected to the vacuum chamber 14 by means of a right-angled coupling 27. In the apparatus as illustrated in Fig. 1 the vacuum causes the movable diaphragm 28 to move to the right thereby moving the indicator arm 33 to the left side of the scale 36 which is the low porosity side. If the material being tested is highly porous the vacuum will be very slight and the indicator arm will arrange itself, by means of the pull of the spring lever 30, on the right side of the scale. Because of the construction of the draft gauge and the manner in which the indicator point 33 is connected to it, the pointer would ordinarily remain on the right side of the graduated scale 36 when the apparatus is turned off by means of the switch 40. As this is the high porosity side of the scale, such action might be confusing to anyone not familiar with the construction of the apparatus. To prevent such confusion, an attachment is provided on the switch 40 (Fig. 4) so that when the switch is turned to the left to turn it off, a hinged coupling arm 46 moves out and forces the indicator pointer 33 to the left where it is rigidly held in the zero position. This also protects the indicating means from damage due to jar when the portable apparatus is being moved about. When the switch 40 is turned to the right again in a short arc to turn the apparatus on, the pressure on the indicator is removed so that it is free to act in conjunction with the diaphragm of the pressure gauge 26. This locking of the pointer on the off position has, of course, no effect on the efficient operation of the apparatus when the switch is turned on and the pressure on the indicator is removed.

The apparatus described herein may be used to test the porosity of a wide variety of porous materials. The scale used to show this porosity may be graduated in absolute units or it may have no units at all and be used to show the relative porosity of two or more pieces of porous material or materials. As can be seen the apparatus has the potentialities of a wide range of possible uses. Because of its ready portability, it is especially valuable as a sales demonstration device for use in showing the relative porosities of competitive materials.

Having disclosed our invention herein it is our object to protect it broadly within the spirit and scope of the appended claims.

We claim:

1. Porosity measuring apparatus comprising, in combination, power driven means for setting up and maintaining a current of fluid through the porous material being tested, indicating means responsive to such flow of fluid, manually operated means for starting and stopping the said power driven means, and means actuated by the last said manually operated means for setting the indicator means to a pre-determined position when the apparatus is stopped.

2. An apparatus for measuring the porosity of porous materials comprising a foraminous platform designed to permit the free flow of air through the surface of the platform, the porous material that is to be tested resting on the platform, and porosity measuring apparatus in contact with the porous material and comprising, in combination, power driven means for setting up and maintaining a current of air through the porous material, indicating means responsive to such flow of air, manually operated means for starting and stopping the said power driven means, and means actuated by the last said manually operated means for setting the indicator means to a pre-determined position when the measuring apparatus is stopped.

3. An apparatus for measuring the porosity of porous materials comprising a foraminous platform designed to permit the free flow of air through the surface of the platform, the porous material to be tested resting on the platform, and porosity measuring apparatus in contact with the porous material and comprising, in combination, a vacuum chamber in contact with the porous material, a fan for evacuating air from said vacuum chamber, a substantially constant speed motor for driving said fan, an outlet port for expelling the air, indicating means for measuring the vacuum created by said evacuation, manually operated means for starting and stopping said fan, and means actuated by the last said manually operated means for setting the indicator means to a pre-determined position when the apparatus is stopped.

4. In an apparatus for measuring the porosity of porous materials an indicator means for indicating the degree of porosity, a switch for starting and stopping the apparatus, and means actuated by said switch for setting the indicator means to a pre-determined position when the apparatus is stopped.

5. In an apparatus for measuring the porosity of porous materials an indicator means for indicating degree of porosity, a scale against which the indicating means operates, a switch for starting and stopping the apparatus, and means actuated by said switch for setting the indicator means to the zero position on the low porosity side of the scale.

6. In an apparatus for measuring the porosity of porous materials, indicator means for indicating the degree of porosity, operator-controlled means for starting and stopping functioning of the apparatus, and means actuated by said operator-controlled means for re-setting the indicator means to a pre-determined position.

7. Porosity measuring apparatus of the type in which a current of air or the like is maintained flowing through a sample of material undergoing test and a fluid-flow characteristic of the current is measured as an indication of porosity, said apparatus consisting essentially of two compact self-contained units both light in weight for ready transportability; one of said units comprising a platform-like member adapted to be placed on a table or the like and having a foraminous surface supported so as to permit free flow of air under and upward through the foraminous surface, the upper side of the said unit being generally flat for receiving and supporting a sample of material to be tested; the other of said units comprising a substantially enclosed structure having a generally flat bottom for resting on the said sample of material to be tested, said structure having an air-inlet opening in said bottom and an air-outlet opening having free access to the atmosphere, said second unit also including means substantially entirely enclosed by the said second unit structure for drawing air in through the said sample and through the said air-inlet opening and for driving air out the said air-outlet opening, together with similarly enclosed means for measuring and indicating a fluid-flow characteristic of the current of air while it is passing through said second unit, the indicating means being visible externally of the unit; and the entire apparatus being so constructed and arranged that tests may be conducted by merely placing on the first unit a sample of porous material to be tested, placing the second unit thereover so that it rests on the sample, and starting the air current producing means.

8. Porosity measuring apparatus of the type in which a current of air or the like is maintained flowing through a sample of material undergoing test and a fluid-flow characteristic of the current is measured as an indication of porosity, said apparatus consisting essentially of two compact, self-contained, and independent units both light in weight for ready transportability; one of said units comprising a platform-like member adapted to be placed on a table or the like and having a foraminous surface supported so as to permit free flow of air under and upward through the foraminous surface, the upper side of the said unit being generally flat for receiving and supporting a sample of material to be tested; the other of said units comprising a substantially enclosed box-like structure provided with handle means for ready manual portability and having a generally flat bottom for resting on the said sample of material to be tested, said structure having an air-inlet opening in said bottom and an air-outlet opening having free access to the atmosphere, said second unit also including means substantially entirely enclosed within the box-like structure for drawing air in through the said sample and through the air-inlet opening and for driving air out the air-outlet opening, together with similarly enclosed means for measuring and indicating the rate of flow of the air while it is passing through said second unit as indicative of the porosity of the porous material being tested, said indicating means being visible externally of the unit, and the entire apparatus being so constructed and arranged that tests may be conducted by merely placing on the first unit a sample of porous material to be tested, placing the second unit thereover so that it rests on the sample, and starting the air current producing means.

9. Porosity indicating apparatus comprising a container having a wall portion adapted to be placed against a surface of porous material to be tested, said wall portion having an aperture therein and presenting a sealing surface about said aperture; a partition offset inwardly from said wall providing a chamber adjacent said aperture and in communication therewith; a second chamber adjacent said partition; said partition having an orifice therein providing communication between the two said chambers; said second chamber having a second opening communicating with the outside atmosphere through another wall portion of said container; fan means in the said second chamber for causing a current of air to flow through the apparatus and the porous material being tested; and means responsive to flow of air through the apparatus for indicating a porosity characteristic of the material being tested.

10. Porosity indicating apparatus comprising a container having a wall portion adapted to be placed against a surface of porous material to be tested, said wall portion having an aperture therein and the portions of the wall about the aperture being adapted to form a seal with the porous material; a partition forming a vacuum chamber extending into the container from said aperture; said aperture opening into said vacuum chamber; outlet means including an opening communicating with the outside atmosphere through another wall portion of said container; said partition having an orifice therein providing communication between the vacuum chamber and the outlet means; means within the container for creating vacuum in said vacuum chamber and thereby causing a current of air to flow through the material being tested, thence through the apparatus and out through the said outlet means; and means responsive to flow of air through the apparatus for indicating a porosity characteristic of the material being tested.

11. Porosity indicating apparatus comprising a readily-portable, unitary device including a plate-like wall structure adapted to be placed upon a surface of porous material to be tested and to form a seal therewith; said plate-like wall structure having an aperture therein for permitting flow of air through the apparatus and the material being tested; air-conducting means leading from said aperture to a second aperture communicating with the atmosphere; a partition having an orifice therein interposed in said air-conducting means between the two said apertures; means disposed above and in substantial alignment with the first said aperture for causing a current of air to flow through the said air-conducting means and the material being tested; and means responsive to flow of air through the apparatus for indicating a porosity characteristic of the material being tested; said air-conducting means, said partition, said air-flow producing means and said indicating means all being supported by the said plate-like wall structure and being readily portable therewith as a unit.

STUART H. HAHN.
ROBERT H. JUDSON.